3,034,953
COMPOSITIONS CONTAINING 2,4,5-TRICHLOR-PHENOL FOR THE PREVENTION OF FUNGAL AND ALGAL GROWTH
Theodore C. Swinyar, Collegedale Medical Center, Collegedale, Tenn.
No Drawing. Filed Dec. 15, 1960, Ser. No. 75,935
2 Claims. (Cl. 167—31)

This invention relates to a composition which eliminates and prevents mildew, fungal and algal growth, on either wet or dry surfaces. More particularly, it relates to a composition which has been found to effectively prevent the formation of mildew or fungal or algal growth on surfaces of organic or inorganic materials.

In a copending application Serial No. 753,614, filed August 7, 1958, which issued on February 14, 1961, as United States Patent 2,971,883, I have disclosed a composition consisting of a substantially saturated solution of 2,4,5-trichlorophenol in a solution of paraffin wax in benzene, which has been found to be particularly effective in protecting the walls of X-ray photo-development tanks against the development of microorganisms on the tank walls. It was disclosed that once it had been applied to the tank walls, the composition retained its effectiveness for relatively long intervals even though it was exposed to a series of flowing liquids, used in the processing of film in the tanks.

The compositions of the present invention are improvements over my earlier compositions and are intended to confer similar benefits to surfaces which are dry or which are merely exposed to more or less humid atmospheres. Thus, instead of being applicable primarily to the walls of liquid-containing tanks, the compositions about to be described may be used on leather goods, books, closet walls, cloth, metal surfaces, ceramic objects such as bathroom tile, and many other surfaces where mildew or algal or fungal growth is a problem. Preferably the surfaces to which my compositions are applied should be dry and clean. The compositions dry in air at normal room temperatures in about two minutes and may be applied by any convenient known coating technique. I prefer to spray the composition onto the object to be protected, but satisfactory results have been obtained when the compositions were applied by brush, roller or by other similar means.

The compositions of this invention are prepared in slurry form by mixing together two separate compositions. The first of these consists principally of aliphatic and aromatic solvents which appear to serve merely as carriers for the constituents contained in the second.

A preferred specific formulation of the solvent portion of the final composition contains the following:

*First Mixture*

[Parts by volume]

| Constituent | Preferred | Range |
|---|---|---|
| Isobutyl acetate | 40 | 30–50 |
| Ethyl alcohol-butyl alcohol (2:1) | 10 | 8–12 |
| Toluene | 25 | 20–30 |
| Xylene | 25 | 20–30 |
| Silicone (1,000 cps.) | 0.01 | 0.01–0.03 |
| Adhesive (optional) | 3 | 2–4 |
| Aromatic odor (optional) | | |

In the above formulation the ingredients in the solvent system are brought together in the order listed. The isobutyl acetate-alcohol-toluene-xylene compositions given above constitute volatile, readily evaporable, inert carriers in which the remaining ingredients are readily dissolved or suspended. Other solvents may be used in place of those specified, provided they dissolve the polychlorphenol and film-forming constituents comprising the second portion of my novel compositions. Thus, other ketones, ethers, esters, alcohols and other highly volatile solvents may be substituted for one or another of the first four listed constituents.

The silicone appears to improve the composition in several ways. First of all, it appears to impart improved homogeneity to the final composition and to make it appear smoother in texture; secondly, when present in the composition applied to a solid surface, it appears to impart moisture-shedding properties to the treated surface; and finally it appears to prevent plugging of the valve tip when the final composition is applied by spraying.

On porous substrates and especially on organic materials no adhesive need be present in the composition, but when it is applied to metal or enamel or other smooth, impervious bases, the presence of an adhesive in the composition has been found to improve the adherence of the film to the base.

Because of the marked pungent odor of several of the solvents the inclusion of a highly volatile, non-toxic, masking odor in the composition has also been found to be desirable. Any suitable pleasant scent, compatible with the other ingredients may be used, and I have found Or O Tyme, a fragrant product of Magnus Mabee & Reynard, to be suitable as it is relatively inexpensive and produces no staining of the base material.

In order that the composition remain effective as an antifungal or mildew preventing agent for from four to six months, it has been found necessary to incorporate therein a second mixture consisting of a polychlorphenol and a film-former soluble in the above solvent system. When the resulting composition is deposited on the solid surface to be protected from mildew or algal or fungal growth, after the solvents have evaporated, a thin, hardly noticeable, clear film remains on the surface, from which the anti-mildew material is slowly expended or removed with the passage of time.

A preferred specific formulation of the second portion of the final composition consists of the following:

*Second Mixture*

[Grams per 100 cc. of final composition]

| | Range | Preferred |
|---|---|---|
| Cellulose butyrate (half-second) | 5–10 | 7 |
| 2,4,5-Trichlorphenol | 2–8 | 5 |

Once a suitable solvent has been formulated by combining the ingredients in the first mixture in the manner described above, a homogeneous viscous slurry is prepared by gradually adding a mixture of 2,4,5-trichlorphenol and half-second cellulose butyrate to a portion of the prepared mixture. The butyrate constitutes a thickener and film-former and should comprise about 5 to 10 grams of each 100 cc. of the final formulation which is applied to the surfaces to be protected. About 7 grams of butyrate is optimum. A somewhat smaller proportion of trichlorphenol is employed, namely between 2 and 8 grams of this in 100 cc. of the final coating formulation, and about 5 grams of 2,4,5-trichlorphenol in 100 cc. of formula has been used with particularly satisfactory results. Then the slurry is thinned by the addition of the remaining portion of the first mixture.

Other polychlorphenols such as tetrachlor- and hexa-chlor-phenols may be used but the 2,4,5-trichlorphenol is preferred by me because it is less irritating to the human skin than the more highly chlorinated phenols.

Similarly, other rapidly drying film-formers may be used in place of the half-second cellulose butyrate preferred by me, provided they form a similar water-insoluble film which slowly releases the chlorinated phenol.

Compositions prepared as above described have been sprayed, brushed and rolled onto surfaces of the types indicated and have prevented the formation of mildew or the growth of fungi or algae thereon for upwards of six months. Similar surfaces had mildewed or experienced fungal or algal growth in less than one week in the absence of such treatment when exposed to identical environments.

While the above represents specific examples of a preferred embodiment of my invention, it will be evident to those skilled in the art that some changes may be made in the constituents and in the proportions of the composition described without departing from the spirit of my invention.

What I claim as new is as follows:

1. A composition for the elimination of mildew and the prevention of fungal and algal growth consisting essentially of a mixture of

| | |
|---|---|
| Isobutyl acetate | 30–50 parts by volume. |
| Ethyl alcohol-butyl alcohol (2:1 mixture) | 8–12 parts by volume. |
| Toluene | 20–30 parts by volume. |
| Xylene | 20–30 parts by volume. |
| Cellulose butyrate (half second) | 5–10 grams per 100 parts by volume. |
| 2,4,5-trichlorphenol | 5–8 grams per 100 parts by volume. |

2. The composition of claim 1 including in addition .01–.03 part by volume of a silicone.

References Cited in the file of this patent
UNITED STATES PATENTS

| | | |
|---|---|---|
| 2,182,081 | Hatfield | Dec. 5, 1939 |
| 2,439,395 | Leatherman | Apr. 13, 1948 |
| 2,491,287 | Smith et al. | Dec. 13, 1949 |
| 2,971,883 | Swinyar | Feb. 14, 1961 |